United States Patent
Huang et al.

(10) Patent No.: US 7,967,068 B2
(45) Date of Patent: *Jun. 28, 2011

(54) PARTICLES IN OIL FOR VISCOELASTIC SURFACTANT GELLED FLUIDS

(75) Inventors: Tianping Huang, Spring, TX (US); James B. Crews, Willis, TX (US)

(73) Assignee: Baker Hughes Incorporated, Houston, TX (US)

( * ) Notice: Subject to any disclaimer, the term of this patent is extended or adjusted under 35 U.S.C. 154(b) by 116 days.

This patent is subject to a terminal disclaimer.

(21) Appl. No.: 12/047,090

(22) Filed: Mar. 12, 2008

(65) Prior Publication Data

US 2008/0149334 A1  Jun. 26, 2008

Related U.S. Application Data (63) Continuation-in-part of application No. 11/970,389, filed on Jan. 7, 2008, now Pat. No. 7,615,517, which is a continuation-in-part of application No. 11/517,688, filed on Sep. 8, 2006, now Pat. No. 7,347,266.

(60) Provisional application No. 60/717,307, filed on Sep. 15, 2005.

(51) Int. Cl.
*E21B 43/22* (2006.01)

(52) U.S. Cl. ...................... 166/282; 166/305.1; 166/300

(58) Field of Classification Search ........................ None
See application file for complete search history.

(56) References Cited

U.S. PATENT DOCUMENTS

| | | | |
|---|---|---|---|
| 4,502,969 | A | 3/1985 | Shell |
| 5,964,295 | A | 10/1999 | Brown et al. |
| 5,979,555 | A | 11/1999 | Gadberry et al. |
| 6,239,183 | B1 | 5/2001 | Farmer et al. |

(Continued)

FOREIGN PATENT DOCUMENTS

WO   WO2004087286 A1   10/2004

OTHER PUBLICATIONS

B. R. Stewart et al.; Use of a Solids-free Viscous Carrying Fluid in Fracturing Applications: An Economic and Productivity Comparison in Shallow Completions, SPE 30114, European Formation Damage Control Conference, May 15-16, 1995, The Hague, Netherlands, pp. 379-392.

J. E. Brown et al; Use of a Viscoelastic Carrier Fluid in Frac-Pack Applications, SPE 31114, SPE Formation Damage Symposium, Feb. 14-15, 1996, Lafayette, LA, pp. 438-448.

ExxonMobil Chemical, Hydrocarbon Fluids, EXXSOL D 80 Fluid, 2000.

(Continued)

*Primary Examiner* — Zakiya W Bates
*Assistant Examiner* — Angela M Ditrani
(74) *Attorney, Agent, or Firm* — Mossman Kumar & Tyler PC (57) ABSTRACT

Fluids viscosified with viscoelastic surfactants (VESs) may have their fluid loss properties improved with the presence of at least one mineral oil in combination with at least one particulate fluid loss control agent that may be an alkaline earth metal oxides, alkaline earth metal hydroxides, transition metal oxides, transition metal hydroxides, and mixtures thereof. The mineral oil may initially be dispersed oil droplets in an internal, discontinuous phase of the fluid. In one non-limiting embodiment, the mineral oil is added to the fluid after it has been substantially gelled. The particulate fluid loss control agent may be added in any order relative to the VES and the mineral oil fluid loss control agent. The mineral oil may enhance the ability of a particulate fluid loss control agent to reduce fluid loss. The presence of the mineral oil may also eventually reduce the viscosity of the VES-gelled aqueous fluid.

12 Claims, 4 Drawing Sheets

U.S. PATENT DOCUMENTS

| | | | |
|---|---|---|---|
| 6,881,709 | B2 | 4/2005 | Nelson et al. |
| 2004/0152604 | A1 | 8/2004 | Qu et al. |
| 2005/0252658 | A1 | 11/2005 | Willingham et al. |
| 2006/0019834 | A1 | 1/2006 | Melbouci et al. |
| 2007/0032386 | A1 | 2/2007 | Abad et al. |
| 2007/0151726 | A1 | 7/2007 | Crews et al. |
| 2008/0060812 | A1 | 3/2008 | Huang et al. |
| 2008/0202744 | A1* | 8/2008 | Crews et al. ............ 166/246 |

OTHER PUBLICATIONS

M. Samuel et al.; Viscoelastic Surfactant Fracturing Fluids: Applications in Low Permeability Reservoirs, SPE 60322, 2000 SPE Rocky Mountain Regional/Low Permeability Reservoirs Symposium and Exhibition, Denver, CO, Mar. 12-15, 2000, pp. 1-7.

P. M. McElfresh et al.; A Single Additive Non-ionic System for Frac Packing Offers Operators a Small Equipment Footprint and High Compatibility with Brines and Crude Oils, SPE 82245, SPE European Formation Damage Conference, The Hague, The Netherlands, May 13-14, 2003, pp. 1-11.

Crompton, HYDROBRITE 200 PO White Mineral Oil, Product Description, Sep. 8, 2005, available at http://www.cromptoncorp.com/servlet, pp. 1-2.

Crompton, Product Search Results for White Mineral Oil, Sep. 8, 2005, available at http://www.cromptoncorp.com/servlet.

Crompton, Related Products, Hydrobrite 200 PO and Hydrobrite 550 PO, Sep. 8, 2005, http://www.cromptoncorp.com/servlet.

* cited by examiner

PARTICLES IN OIL FOR VISCOELASTIC SURFACTANT GELLED FLUIDS

CROSS-REFERENCE TO RELATED APPLICATIONS

This application is a continuation-in-part application of U.S. patent application Ser. No. 11/970,389 filed Jan. 7, 2008, now U.S. Pat. No. 7,615,517 which is a continuation-in-part application of U.S. patent application Ser. No. 11/517,688 filed Sep. 8, 2006, issued Mar. 25, 2008 as U.S. Pat. No. 7,347,266, which in turn claims the benefit of U.S. Provisional Application No. 60/717,307 filed Sep. 15, 2005.

TECHNICAL FIELD

The present invention relates to gelled treatment fluids used during hydrocarbon recovery operations, and more particularly relates, in one embodiment, to methods of improving the fluid loss properties of aqueous treatment fluids containing viscoelastic surfactant gelling agents used during hydrocarbon recovery operations.

TECHNICAL BACKGROUND

One of the primary applications for viscosified fluids is hydraulic fracturing. Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates that can cause the fluids to degrade and prematurely settle out the proppant before the fracturing operation is complete. Various fluids have been developed, but most commercially used fracturing fluids are aqueous-based liquids that have either been gelled or foamed. When the fluids are gelled, typically a polymeric gelling agent, such as a solvatable polysaccharide, for example guar or a derivatized guar polysaccharide, is used. The thickened or gelled fluid helps keep the proppants within the fluid. Gelling can be accomplished or improved by the use of crosslinking agents or crosslinkers that promote crosslinking of the polymers together, thereby increasing the viscosity of the fluid. One of the more common crosslinked polymeric fluids is borate crosslinked guar.

While polymers have been used in the past as gelling agents in fracturing fluids to carry or suspend solid particles as noted, such polymers require separate breaker compositions to be injected to reduce the viscosity. Further, such polymers tend to leave a coating on the proppant and a filter cake of dehydrated polymer on the fracture face even after the gelled fluid is broken. The coating and/or the filter cake may interfere with the functioning of the proppant. Studies have also shown that "fish-eyes" and/or "microgels" present in some polymer gelled carrier fluids will plug pore throats, leading to impaired leakoff and causing formation damage. Conventional polymers are also either cationic or anionic which present the disadvantage of likely damage to the producing formations.

Aqueous fluids gelled with viscoelastic surfactants (VESs) are also known in the art. VES-gelled fluids have been widely used as gravel-packing, frac-packing and fracturing fluids because they exhibit excellent rheological properties and are less damaging to producing formations than crosslinked polymer fluids. VES fluids are non-cake-building fluids, and thus leave no potentially damaging polymer cake residue. However, the same property that makes VES fluids less damaging tends to result in significantly higher fluid leakage into the reservoir matrix, which reduces the efficiency of the fluid especially during VES fracturing treatments. It would thus be very desirable and important to discover and use fluid loss agents for VES fracturing treatments in high permeability formations.

SUMMARY

There is provided, in one form, a method for reducing the fluid loss of aqueous fluids gelled with a viscoelastic surfactant (VES) that involves adding to an aqueous fluid in any order: at least one VES, at least one mineral oil fluid loss control agent and at least one particulate fluid loss control agent. The mineral oil has a viscosity greater than 20 cps at ambient temperature. The particulate fluid loss control agent may be an alkaline earth metal oxide, an alkaline earth metal hydroxide, a transition metal oxide, a transition metal hydroxide, and/or mixtures thereof. These fluid loss control agents are present in amounts effective to reduce the fluid loss of the gelled aqueous fluid.

In another embodiment, there is provided an aqueous fluid that includes water; at least one VES in an amount effective to increase the viscosity of the aqueous fluid; and at least one mineral oil in an amount effective to reduce the fluid loss of the gelled aqueous fluid. Again, the mineral oil has a viscosity greater than 20 cps at ambient temperature. The aqueous fluid also contains at least one particulate fluid loss control agent in an amount effective to reduce the fluid loss of the gelled aqueous fluid. Again, the particulate fluid loss control agent may be an alkaline earth metal oxide, an alkaline earth metal hydroxide, a transition metal oxide, a transition metal hydroxide, and/or mixtures thereof. In one non-limiting embodiment, the particulate fluid loss control agent has a particle size of equal to or less than about 0.2 millimeter

DETAILED DESCRIPTION

It has been discovered that the addition of certain small particles with certain mineral oils in relatively small quantities to an aqueous fluid gelled with a VES improved the fluid loss of these brines. The fluid loss control agents herein are believed to be particularly useful in VES-gelled fluids used for well completion and/or stimulation. The VES-gelled fluids may further comprise proppants or gravel, if they are intended for use as fracturing fluids or gravel packing fluids, although such uses do not require that the fluids include proppants or gravel. It is especially useful that the removal of these fluid loss control agents may be easy and complete maintaining little or no damage to the formation. In particular, the VES-gelled aqueous fluids with these mineral oils are expected to have improved (reduced, diminished or prevented) fluid loss over a broad range of temperatures, such as from about 70 (about 21° C.) to about 400° F. (about 204° C.); alternatively up to about 350° F. (about 177° C.), and in another non-limiting embodiment up to about 300° F. (about 149° C.). In some cases suitable reservoir temperatures may be between about 100° to about 270° F. (about 37° to about 132° C.). Briefly, the mineral oils are used together with other fluid loss control agents such as alkaline earth metal oxides, alkaline earth metal hydroxides, transition metal oxides, transition hydroxides, and a mixture thereof. These latter fluid loss control agents are further described in U.S. patent application Ser. No. 11/755,581 published as U.S. Patent Application Publication No. 2008/0060812 A1, incorporated by reference herein in its entirety. Further, the mineral oils described herein alone do not noticeably change the initial viscosity of VES-gelled fluids for at least 90 minutes, which is surprising given that reservoir hydrocarbons are known to break VES-gelled fluids. However, the combination of certain mineral oils with certain small particles can be used to controllably reduce the viscosity of VES-gelled fluid.

This discovery allows the VES system to have improved fluid loss to help minimize formation damage during well completion or stimulation operations. That is, the introduction of these additives to the VES-gelled aqueous system will limit and reduce the amount of VES fluid which leaks-off into the pores of a reservoir, such as during the use as a fluid loss control pill, or during a fracturing or frac-packing treatment, thus minimizing the formation damage that may occur by the VES fluid within the reservoir pores. Also, limiting the amount of VES fluid that leaks-off into the reservoir during a treatment, in the case of hydraulic fracturing, will allow more fluid to remain within the fracture and thus less total fluid volume will be required for the treatment. Having less fluid leaking off and more fluid remaining within the fracture will enable greater fracture size and geometry to be generated. Thus, the use of these additives in a VES-gelled aqueous system will improve the performance of the VES fluid while lowering fracturing treatment cost.

Prior art VES-gelled aqueous fluids, being non-wall-building fluids (i.e. there is no polymer or similar material build-up on the formation face to form a filter cake) that do not build a filter cake on the formation face, have viscosity-controlled fluid leakoff into the reservoir. By contrast, the methods and compositions herein use a fluid loss agent that forms small oil drops to hinder the water-based VES fluid flow through the porous medium to reduce fluid leakoff. Surprisingly the small oil drops are very compatible with the VES micelle structures in the fluid and do not significantly reduce or impair the viscosity of VES fluid during the pumping of a treatment.

The particulate fluid loss agents herein associate with the VES micelles and as VES fluid is leaked-off into the reservoir a viscous layer of micelles accumulate on the formation face, thus reducing the rate of VES fluid leakoff. It has been discovered that particulate plugging of the reservoir pores is not the mechanism of leakoff control or the mechanism that allows development of the viscous micelle layer.

This new method has been discovered to reduce the leakoff of aqueous fluids gelled with viscoelastic surfactants (i.e. surfactants that develop viscosity in aqueous brines, including chloride brines, by formation of rod- or worm-shaped micelle structures). The improvement will permit less VES to be used since less of it will leak off into the formation. The synergistic combination of fluid loss control agents herein may be added to the gel after batch mixing of a VES-gel treatment or added on-the-fly after continuous mixing of a VES-gel treatment using a liquid additive metering system in one non-limiting embodiment. The high viscosity mineral oils are not solubilized in the brine, since they are inherently highly hydrophobic, but initially they are dispersed as microscopic oil droplets. The oil droplets may be understood as dispersed in the "internal phase" as a "discontinuous phase" of the brine medium/VES fluid which is the "outer phase" or "continuous phase".

Surprisingly and unexpectedly the method employs mineral oils as a fluid loss control component. This is surprising because the literature teaches that contact of a VES-gelled fluid with hydrocarbons, such as those of the subterranean formation in a non-limiting example, essentially instantaneously reduces the viscosity of the gel or "breaks" the fluid. By "essentially instantaneously" is meant less than one-half hour. In general mineral oils are highly saturated hydrocarbons and from the literature one would expect VES-micelles to break upon contacting saturated hydrocarbons.

Additionally, surprisingly and unexpectedly the method of combining certain mineral oils with certain small particles can be used to also controllably break the viscosity of VES fluid, as compared to using the mineral oils or small particles independently.

In one non-limiting embodiment the mineral oil is added before the VES gelling agent. In another non-limiting embodiment herein the mineral oil is added after the aqueous fluid is substantially gelled. By "substantially gelled" is meant that at least 90% of the viscosity increase has been achieved before the mineral oil is added. Of course, it is acceptable to add the mineral oil after the gel has completely formed.

Mineral oil (also known as liquid petrolatum) is a by-product in the distillation of petroleum to produce gasoline. It is a chemically inert transparent colorless oil composed mainly of linear, branched, and cyclic alkanes (paraffins) of various molecular weights, related to white petrolatum. Mineral oil is produced in very large quantities, and is thus relatively inexpensive. Mineral oil products are typically highly refined, through distillation, hydrogenation, hydrotreating, and other refining processes, to have improved properties, and the type and amount of refining varies from product to product. Highly refined mineral oil is commonly used as a lubricant and a laxative, and with added fragrance is marketed as "baby oil" in the U.S. Most mineral oil products are very inert and non-toxic, and are commonly used as baby oils and within face, body and hand lotions in the cosmetics industry.

Other names for mineral oil include, but are not necessarily limited to, paraffin oil, paraffinic oil, lubricating oil, white mineral oil, and white oil.

In one non-limiting embodiment the mineral oil has a high content of isoparaffins, and is at least 99 wt % paraffinic. Because of the relatively low content of aromatic compounds, mineral oil has a better environmental profile than other oils. In general, the more refined and less aromatic the mineral oil, the better. In another non-restrictive version, the mineral oil may have a distillation temperature above about 300° C. In another non-restrictive version, the mineral oil has a dynamic viscosity of greater than about 20 cps at ambient temperature. Ambient temperature is defined herein as about 20° C. (68° F.). In an alternate, non-limiting embodiment, the kinematic viscosity of the mineral oil at 40° C. should be at least about 40 cSt. Specific examples of suitable mineral oils include, but are not necessarily limited to, PURE PERFORMANCE® 225N and 600N Base Oils available from ConocoPhillips, high viscosity Ultra-S mineral oils from S-Oil Corporation, such as Ultra-S 8, and high viscosity mineral oils from Sonneborn Refined Products, such as GLORIA®, KAYDOL®, BRITOL® 35 USP, HYDROBRITE® 200, 380, 550, 1000, and the like. The dynamic viscosity of PURE PERFORMANCE® 225N oil at 40° C. is typically 42.7 cps, and dynamic the viscosity of 600N oil is typically 114.5 cps. The use of mineral oils herein is safe, simple and economical.

In one non-limiting embodiment, other refinery distillates may potentially be used in addition to or alternatively to the mineral oils described herein, as may be hydrocarbon condensation products. Additionally, synthetic oils, such as hydrogenated polyalphaolefins, saturated fatty acids, and other synthetically derived hydrocarbons may be of utility to practice this invention.

The amount of mineral oil needed to improve the leakoff properties of a particular VES-gelled aqueous fluid is dependent upon a number of interrelated factors and is difficult to predict in advance. Typically, empirical laboratory work is helpful to determine a suitable proportion. The dynamic viscosity and/or kinematic viscosity, molecular weight distribution, and amount of impurities (such as aromatics, olefins, and the like) appear to influence the effect a particular mineral oil will have on a VES-gelled fluid at a given temperature. The effective amount of mineral oil ranges from about 0.2 to about 10% bv (by volume) based on the total fluid, in another non-limiting embodiment from a lower limit of about 0.5% bv. Independently the upper limit of the range may be about 3% bv of the total fluid.

The use of the disclosed fluid loss control system described herein is ideal for fluid loss reduction of VES based fracturing fluids. The fluid loss system may also be used for improving fluid loss in gravel pack fluids, acidizing or near-wellbore clean-up diverter fluids, and loss circulation pill fluids composed of VES. The fluid loss system may additionally work for foamed fluid applications (hydraulic fracturing, acidizing, and the like), where $N_2$ or $CO_2$ gas is used for the gas phase. This fluid loss improvement methods and compositions herein will help conserve the fluids used, and the additives therein, for these various applications.

As will be demonstrated, the mineral oil fluid loss control additives may be used together with other fluid loss additives including, but not necessarily limited to, alkaline earth metal oxides, alkaline earth metal hydroxides, transition metal oxides, transition metal hydroxides, and mixtures thereof. Indeed, the mineral oil combined with FLC-40 fluid loss control agent available from Baker Oil Tools (MgO with $D_{50}$=1 micron) can control fluid loss much better than using the FLC-40 agent alone for VES-gelled fluids at high pressure differentials, especially at high temperatures.

These other fluid loss control agents (e.g. MgO and/or $Mg(OH)_2$, and the like) appear to help develop a pseudo-filter cake of VES micelles by associating with them as well as ions and particles (in one non-restrictive explanation) to produce a novel and unusual viscous fluid layer of pseudo-crosslinked elongated micelles on the reservoir face that limits further VES fluid leakoff. Additionally, the art may be further advanced by use of nanometer-sized fluid loss control agents that also form a similar viscous fluid layer of pseudo-crosslinked micelles on the formation face that are equivalent to micron-sized fluid loss control agents herein in controlling rate of VES fluid loss, yet can be non-pore plugging and physically easier to produce back with the VES fluid after a VES treatment. That is, the effectiveness of the method is largely independent of the size of the fluid loss control agents. The use of MgO for fluid loss control also has utility over a broad range of temperature of about 70° F. to about 400° F. (about 21° C. to about 204° C.).

It is especially useful that these additional fluid loss control agents are slowly soluble which permits their removal from the formation to be easy and complete, maintaining little or no damage to the formation. In particular, these VES-gelled aqueous fluids containing the alkaline earth metal and transition metal oxides and hydroxides have improved (reduced, diminished or prevented) fluid loss over a broad range of temperatures, such as from about 70 (about 21° C.) to about 400° F. (about 204° C.); alternatively up to about 350° F. (about 177° C.), and in another non-limiting embodiment up to about 300° F. (about 149° C.). In some cases suitable reservoir temperatures may be between about 100° to about 270° F. (about 38° to about 132° C.). Use of MgO and the like particles, as disclosed within U.S. Pat. No. 7,343,972, incorporated herein by reference in its entirety, may be for high temperature stability of VES viscosity, and applies for temperature applications above about 190° F. (about 88° C.). The use of MgO and the like particles for the fluid loss control herein has application and functionality to much broader temperature range, such as from about 70° F. to about 400° F. (about 21° C. to about 204° C.), and may be used in low salinity monovalent brines, such as 3% KCl.

These additional fluid loss control agents useful herein include, but are not necessarily limited to, slowly soluble alkali earth metal oxides or alkali earth metal hydroxides, transition metal oxides, transition metal hydroxides, or mixtures thereof. In one non-limiting embodiment, the alkali earth metal and transition metals in these additives may include, but are not necessarily limited to, magnesium, calcium, barium, strontium, aluminum, zirconium, vanadium, molybdenum, manganese, iron, cobalt, nickel, palladium, copper, zinc, tin, antimony, titanium, combinations thereof and the like. In one non-restrictive version, the compounds containing transition metals such as copper, tin, nickel, and the like may be used in relatively low concentration compared to or in combination with the alkali earth metals. In one non-restrictive embodiment, the amount of additive ranges from about 2 to about 200 pounds per thousand gallons (pptg) (about 0.2 to about 24 kg/m$^3$) based on the aqueous viscoelastic treating fluid. In another non-restrictive embodiment, the amount of additive may have a lower limit of about 6 pptg (about 0.7 kg/m$^3$) and independently an upper limit of about 80 pptg (about 9.6 kg/m$^3$), and in another non-restrictive version a lower limit of about 8 pptg (about 1 kg/m$^3$) and independently an upper limit of about 40 pptg (about 4.8 kg/m$^3$), and in still another non-limiting embodiment, a lower limit of about 10 pptg (about 1.2 kg/m³) and independently an upper limit of about 25 pptg (about 3 kg/m³).

The amount of transition metal oxides or transition metal hydroxides may range from about 0.0001 pptg (about 0.01 g/m³) independently to an upper limit of about 4 pptg (about 0.45 kg/m³), and in another non-restrictive version from about 0.1 pptg (about 12 g/m³) independently up to about 0.5 pptg (about 60 g/m³). In another non-limiting embodiment, the particle size of these additional fluid loss control agents ranges between about 1 nanometer independently up to about 0.2 millimeter. In another non-limiting embodiment, the particle size of the fluid loss control agents ranges between about 4 nanometers independently up to about 74 microns. The fluid loss control agents may be added along with the VES to the aqueous fluids. In another non-restrictive version these solid fluid loss control agents may have a surface area of between about 10 to about 700 square meters per gram (m²/g).

It turns out that the particle size distribution of magnesium oxide is probably not a major factor for fluid loss control in VES-gelled fluids. In one non-limiting explanation, it appears that there are two primary mechanisms that make magnesium oxides (and the other additional materials) good candidates for fluid loss control agents in VES-gelled fluids. The first mechanism may involve chemisorption formed with magnesium oxide and the fatty amine found in the VES. The chemisorption formed with magnesium oxide particles associating with the long chain hydrocarbons will easily form a plug for a porous formation to control VES-gelled fluid loss. The second mechanism is that magnesium oxide molecular clusters may contain inherited structural defects to generate extra positive charges on the surface of the magnesium oxide molecular clusters. These positive charges will attract to the anionic part in the micelle of VES-gelled fluids and form a larger particle that plugs the pore throats of porous formation to reduce the VES fluid loss. The chemisorption and/or surface charges of magnesium oxide particles associating with the micelles of VES-gelled fluids form a viscous layer or a pseudo-cake on the rock surface to block fluid flowing into the rock. Another advantage for magnesium oxide and the other agents being a good fluid loss agent in VES-gelled fluids is that they are slowly soluble compounds in these systems (e.g. solubility of MgO in water is less than 0.9 milligram per liter of water at ambient temperature), which means that after the VES-gelled fluid treatments, the magnesium oxide (e.g.) will be dissolved into VES-gelled fluids and/or the formation fluids and may be removed during production; therefore, minimizing formation damage that can occur as compared with other known fluid loss control additives or systems.

The solubility of these additional fluid loss control agents is believed to be complex. For instance, the total amount of MgO particles solubilized may be from about 0.0001 to about 0.2 wt %, while the rest may remain as solid particles in a solubility equilibrium in the fluid, although the inventors do not wish to be limited to any particular explanation. The factors that may affect or control the solubility rate and total amount equilibrium include, but are not necessarily limited to, chemical composition, chemical structure, particle or aggregate structure, particle size, hard versus light burns in manufacturing (i.e. degree and duration of heating), fluid salinity, and fluid temperature. In some cases, the compounds may remain as solid particles or at least particles much longer, such as special nano-sized MgO particles with unique crystal compound and aggregate structures. These may be much less soluble and would dissolve at relatively slower rates. Other MgO and nano MgO particles may be faster to dissolve and more total amount will be solubilized; thus there may be a very broad range in rate and amount of solubility. In one non-limiting embodiment an estimate may be that for some MgO products a small portion (about 0.005 to about 0.02 wt %) will solubilize within 1 to 2 minutes (for instance, it has been noticed the water pH increases quickly upon MgO addition) with then another portion continuing to be solubilized until a solubility equilibrium is apparently reached in about 2 to 8 hours. In some non-restrictive versions, the total amount solubilized may be from about 0.1 to about 2.0 wt %. The rate and amount of solubility within mid- to high-salinity fluids may thus be rather complex, for example in one non-limiting explanation it may be that overall a lower solubility rate and amount occurs in saline fluids, e.g. about 11.0 ppg (about 1.3 kg/liter) $CaCl_2$ and about 14.0 ppg (about 1.7 kg/liter) $CaBr_2$. With increasing fluid temperature it may be that the solubility rate increases and the solubility equilibrium is shifted to where more total amount can be solubilized, such as at a fluid temperature of about 250° F. (about 121° C.).

Any suitable mixing apparatus may be used for incorporating the mineral oil and particulate fluid loss additives. In the case of batch mixing, the VES and the aqueous fluid are blended for a period of time sufficient to form a gelled or viscosified solution. The mineral oil and/or particulate fluid loss additive may be added before or after the fluid is substantially gelled. The VES that is useful herein may be any of the VES systems that are familiar to those in the well service industry, and may include, but are not limited to, amines, amine salts, quaternary ammonium salts, amidoamine oxides, amine oxides, mixtures thereof and the like. Suitable amines, amine salts, quaternary ammonium salts, amidoamine oxides, and other surfactants are described in U.S. Pat. Nos. 5,964,295; 5,979,555; and 6,239,183, incorporated herein by reference in their entirety.

Viscoelastic surfactants improve the fracturing (frac) fluid performance through the use of a polymer-free system. These systems, compared to polymeric based fluids, can offer improved viscosity breaking, higher sand transport capability, are in many cases more easily recovered after treatment than polymers, and are relatively non-damaging to the reservoir with appropriate contact with sufficient quantity of reservoir hydrocarbons, such as crude oil and condensate, or with use of internal breaking agents. The systems are also more easily mixed "on the fly" in field operations and do not require numerous co-additives in the fluid system, as do some prior systems.

The viscoelastic surfactants suitable for use in this invention include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2 O^-$ may have the following structure (I):

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amidoamine oxide gelling agent is Akzo Nobel's AROMOX® APA-T formulation, which should be understood as a dipropylamine oxide since both R' groups are propyl.

Materials sold under U.S. Pat. No. 5,964,295 include CLEARFRAC™, which may also comprise greater than 10% of a glycol. One preferred VES is an amine oxide. As noted, a particularly preferred amine oxide is APA-T, sold by Baker Oil Tools as SURFRAQ™ VES. SURFRAQ is a VES liquid product that is 50% APA-T and greater than 40% propylene glycol. These viscoelastic surfactants are capable of gelling aqueous solutions to form a gelled base fluid. One excellent VES system is sold by Baker Oil Tools as DIAMOND-FRAQ™. DIAMOND FRAQ™, which has assured breaking technology that overcomes reliance on external reservoir conditions in order to break, as compared with products such as CLEARFRAC™.

The methods and compositions herein also cover commonly known materials as AROMOX® APA-T manufactured by Akzo Nobel and other known viscoelastic surfactant gelling agents common to stimulation treatment of subterranean formations.

The amount of VES included in the fracturing fluid depends on at least two factors. One involves generating enough viscosity to control the rate of fluid leakoff into the pores of the fracture, and the second involves creating a viscosity high enough to keep the proppant particles suspended therein during the fluid injecting step, in the non-limiting case of a fracturing fluid. The additives herein help improve the first factor. Thus, depending on the application, the VES is added to the aqueous fluid in concentrations ranging from about 0.5 to 25% by volume, alternatively up to about 12 vol % of the total aqueous fluid (from about 5 to 120 gptg). (It will be appreciated that units of gallon per thousand gallons (gptg) are readily converted to SI units of the same value as, e.g. liters per thousand liters.) In another non-limiting embodiment, the range for the present formulations is from about 1.0 to about 6.0% by volume VES product. In an alternate, non-restrictive form, the amount of VES ranges from a lower limit of about 2 independently to an upper limit of about 10 volume %.

It is expected that the fluid loss additives described herein may be used to improve the fluid loss of a VES-gelled aqueous fluid regardless of how the VES-gelled fluid is ultimately utilized. For instance, the fluid loss compositions could be used in all VES applications including, but not limited to, VES-gelled friction reducers, VES viscosifiers for loss circulation pills, drilling fluids, fracturing fluids (including foamed fracturing fluids), gravel pack fluids, viscosifiers used as diverters in acidizing (including foam diverters), VES viscosifiers used to clean up drilling mud filter cake, remedial clean-up of fluids after a VES treatment (post-VES treatment) in regular or foamed fluid forms (i.e. the fluids may be "energized") with the gas phase of foam being $N_2$ or $CO_2$, and the like.

In order to practice the methods described herein, an aqueous fracturing fluid, as a non-limiting example, is first prepared by blending a VES into an aqueous fluid. The aqueous fluid could be, for example, water, brine, aqueous-based foams or water-alcohol mixtures. Any suitable mixing apparatus may be used for this procedure. In the case of batch mixing, the VES and the aqueous fluid are blended for a period of time sufficient to form a gelled or viscosified solution. As noted, the fluid loss additives described herein may be added separately after the fluid is substantially gelled, in one non-limiting embodiment. In another non-limiting embodiment, a portion or all of the fluid loss additives may be added prior to or simultaneously with the VES gelling agent.

Propping agents are typically added to the base fluid after the addition of the VES. Propping agents include, but are not limited to, for instance, quartz sand grains, glass and ceramic beads, bauxite grains, walnut shell fragments, aluminum pellets, nylon pellets, and the like. The propping agents are normally used in concentrations between about 1 to 14 pounds per gallon (120-1700 $kg/m^3$) of fracturing fluid composition, but higher or lower concentrations may be used as the fracture design required. The base fluid can also contain other conventional additives common to the well service industry such as water wetting surfactants, non-emulsifiers and the like. As noted herein, the base fluid may also contain other conventional additives which may help improve the fluid loss characteristics of the VES fluid, and which are added for that purpose in one non-restrictive embodiment.

In a typical fracturing operation, the fracturing fluid herein may be pumped at a rate sufficient to initiate and propagate a fracture in the formation and to place propping agents into the fracture. A typical fracturing treatment would be conducted by mixing a 20.0 to 60.0 gallon/1000 gal water (60.0 liters/– 1000 liters) amine oxide VES, such as SurFRAQ, in a 3% (w/v) (249 lb/1000 gal, 29.9 $kg/m^3$) KCl solution at a pH ranging from about 6.0 to about 9.0. The fluid loss component may be added during the VES addition or more typically after the VES addition using appropriate mixing and metering equipment.

In one embodiment herein, the method is practiced in the absence of gel-forming polymers and/or gels or aqueous fluids having their viscosities enhanced by polymers. However, combination use with polymers and polymer breakers may also be of utility. For instance, polymers may also be added to the VES fluids for further fluid loss control purposes. Types of polymers that may serve as fluid loss control agents include, but are not necessarily limited to, various starches, polyvinyl acetates, polylactic acid, guar and other polysaccharides, gelatins, and the like.

The present invention will be explained in further detail in the following non-limiting Examples that are only designed to additionally illustrate the invention but not narrow the scope thereof.

GENERAL PROCEDURE FOR EXAMPLES

To a blender were added tap water, the wt % and type of indicated salt, followed by the indicated vol % of viscoelastic surfactant (WG-3L -AROMOX® APA-T available from Akzo Nobel). The blender was used to mix the components on a very slow speed, to prevent foaming, for about 30 minutes to viscosity the VES fluid. In the samples where mineral oil was added, the indicated amounts of ConocoPhillips PURE PERFORMANCE® 225N Base Oil was used. Leakoff tests were performed using a static test method and 400 md ceramic disc (0.25 inch thick and 2.5 inches in diameter) representing underground porous medium.

Measurements using a Grace 5500 rheometer at the indicated temperatures at 100 sec$^{-1}$ were used to acquire quantitative viscosity of each sample.

Example 1

Figure 1:
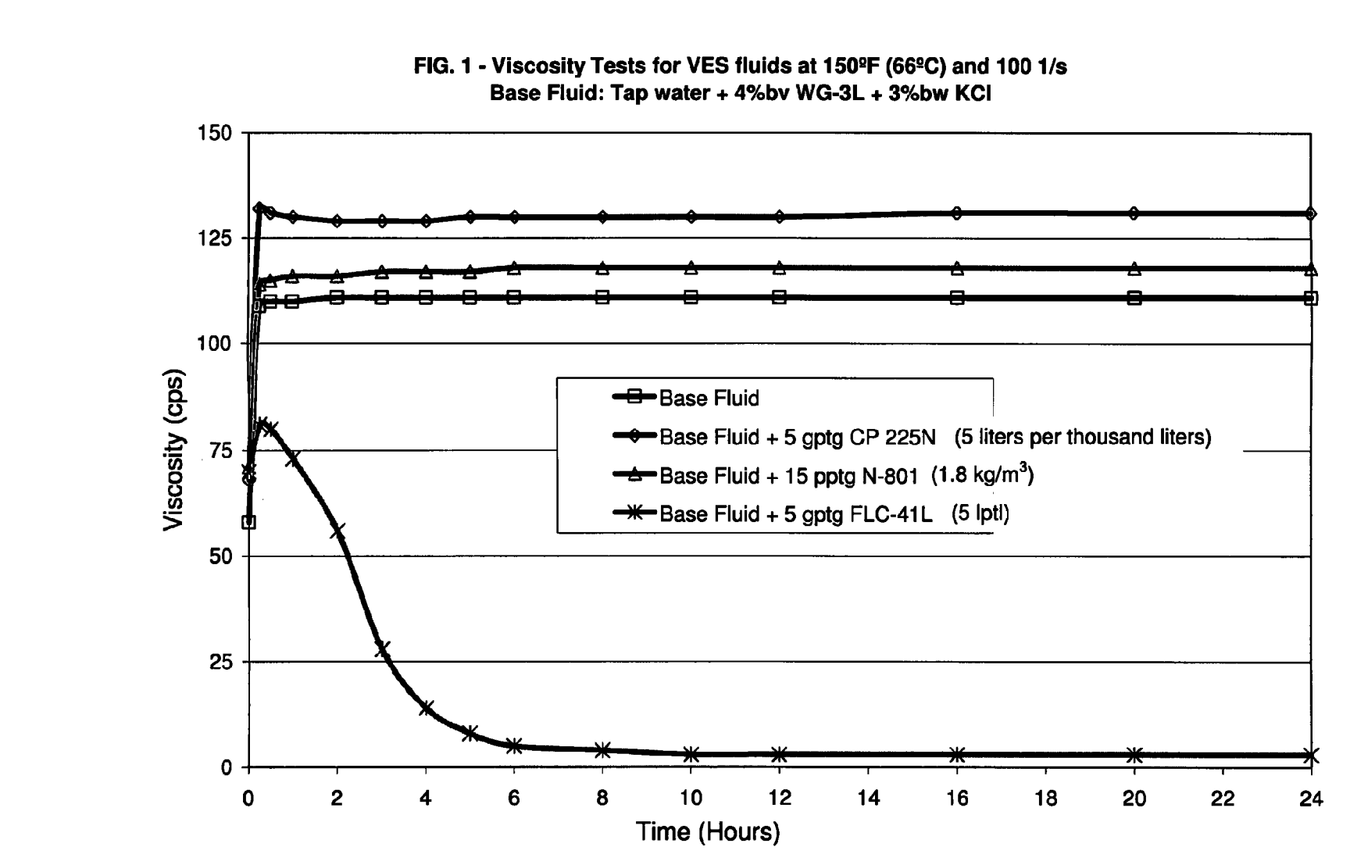
FIG. 1 is a graph of the viscosity of various VES-gelled aqueous fluids at 150° F. (66° C.) and 100 1/s plotted as a function of time for four fluids, a base fluid composed of tap water and 4% by volume (bv) WG-3L VES (50% active surfactant) and 3% by weight (bw) KCl, and then the base fluid with various fluid loss control additives.

Shown in FIG. 1 are the graphs of viscosity tests for four VES-gelled aqueous fluids at 150° F. (66° C.) and 100 1/s plotted as a function of time. The base fluid was composed of tap water and 4% by volume (bv) WG-3L VES and 3% by weight (bw) KCl. Of the three fluids that maintained their viscosity over the test period, the base fluid had the lowest viscosity.

The fluid with the highest viscosity (the uppermost curve) was the base fluid with 5 gptg (5 lptl) of ConocoPhillips PURE PERFORMANCE® 225N Base Oil (abbreviated CP 225N). The fluid with a viscosity intermediate that of the two previously discussed was the base fluid containing 15 pptg (1.8 kg/m$^3$) N-801 (35 nanometer MgO available from Baker Oil Tools).

However, the fourth fluid which contained 5 gptg (5 lptl) of FLC-41L only obtained a viscosity of about 80 cps, which was relatively quickly reduced to near zero. FLC-41L is 1.5 ppg (0.18 kg/l) N-801 MgO slurried in CP 225N mineral oil. The data from the fourth fluid demonstrates that the N-801 (MgO) nanoparticles in CP 225N mineral oil can have a synergistic VES viscosity breaking effect that may be of utility in using VES-gelled fluid. Demonstrated is how the products N-801 and CP 225N used independently do not have a viscosity breaking effect under conditions tested but when used together can controllably reduce VES viscosity. The mechanism for the observed viscosity breaking is not understood at this time.

Example 2

Figure 2:
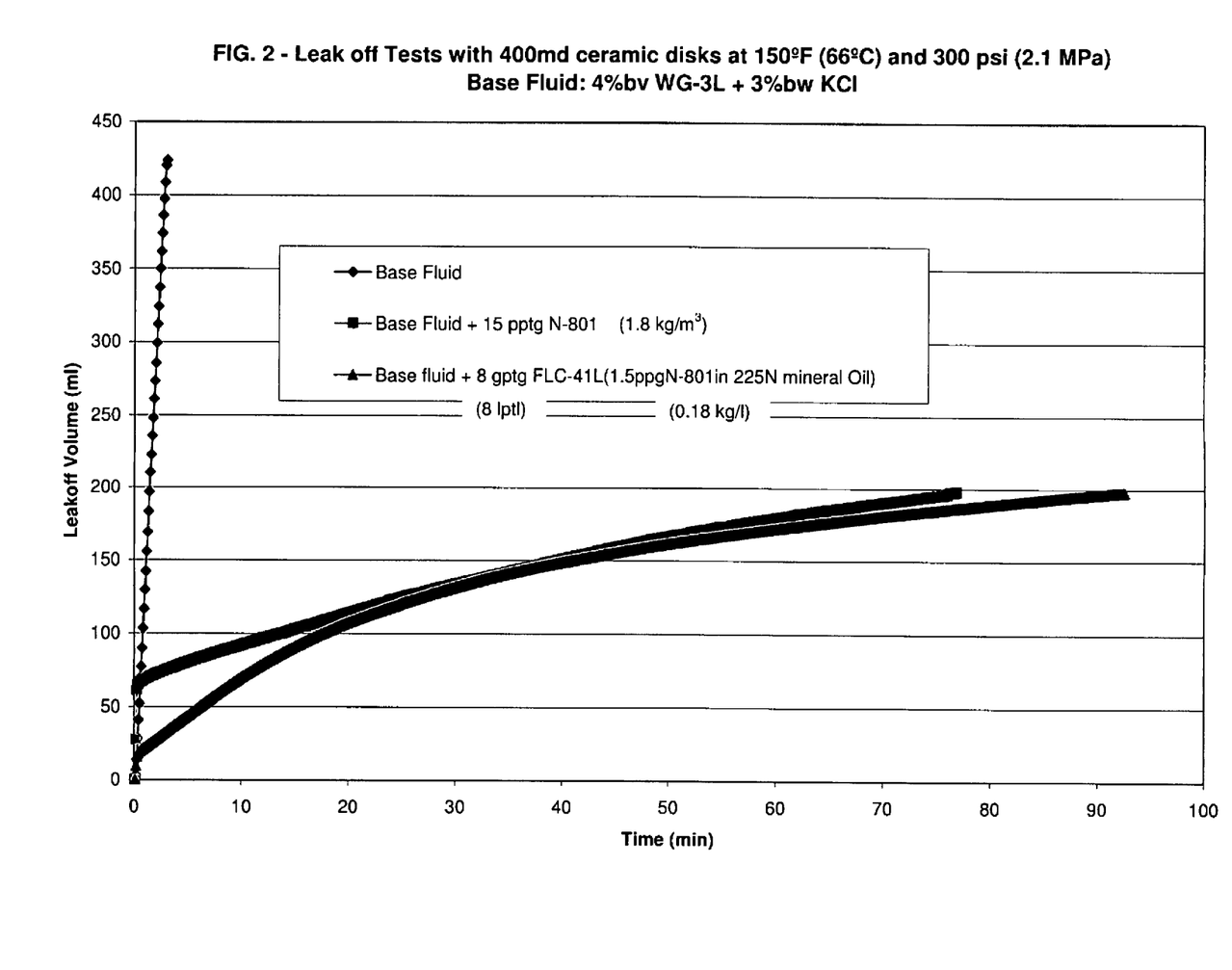
FIG. 2 is a graph of leak off tests using 400 mD ceramic disks at 150° F. (66° C.) and 300 psi (2.1 MPa) plotting leakoff volume as a function of time, again for a base fluid composed of tap water and 4% bv WG-3L VES and 3% bw KCl, and then the base fluid with various fluid loss control additives.

FIG. 2 shows a graph of leak off tests using 400 mD ceramic disks at 150° F. (66° C.) and 300 psi (2.1 MPa) plotting leakoff volume as a function of time, again for a base fluid composed of tap water and 4% bv WG-3L VES and 3% bw KCl, and then the base fluid with various fluid loss control additives. It may be readily seen that the base fluid had rapid leakoff, as shown by the nearly vertical plot.

The base fluid containing 15 pptg (1.8 kg/m$^3$) N-801 35 nm MgO had a much more reduced leakoff volume curve. However, the base fluid with 8 gptg (8 lptl) FLC-41L, containing both 35 nm MgO and mineral oil had a slightly improved fluid loss curve, indicating that the combination of both types of fluid loss additives were effective in improving fluid loss together. It should be noted that the viscosity breaking seen in the rheological test by the FLC-41L additive did not affect its improved fluid loss property during the fluid loss test. For regular hydraulic fracturing treatments, the period of fluid loss control concern is the first 60 minutes of fluid pumping. In the industry standard, the time of fluid loss control test is 64 minutes.

Example 3

Figure 3:
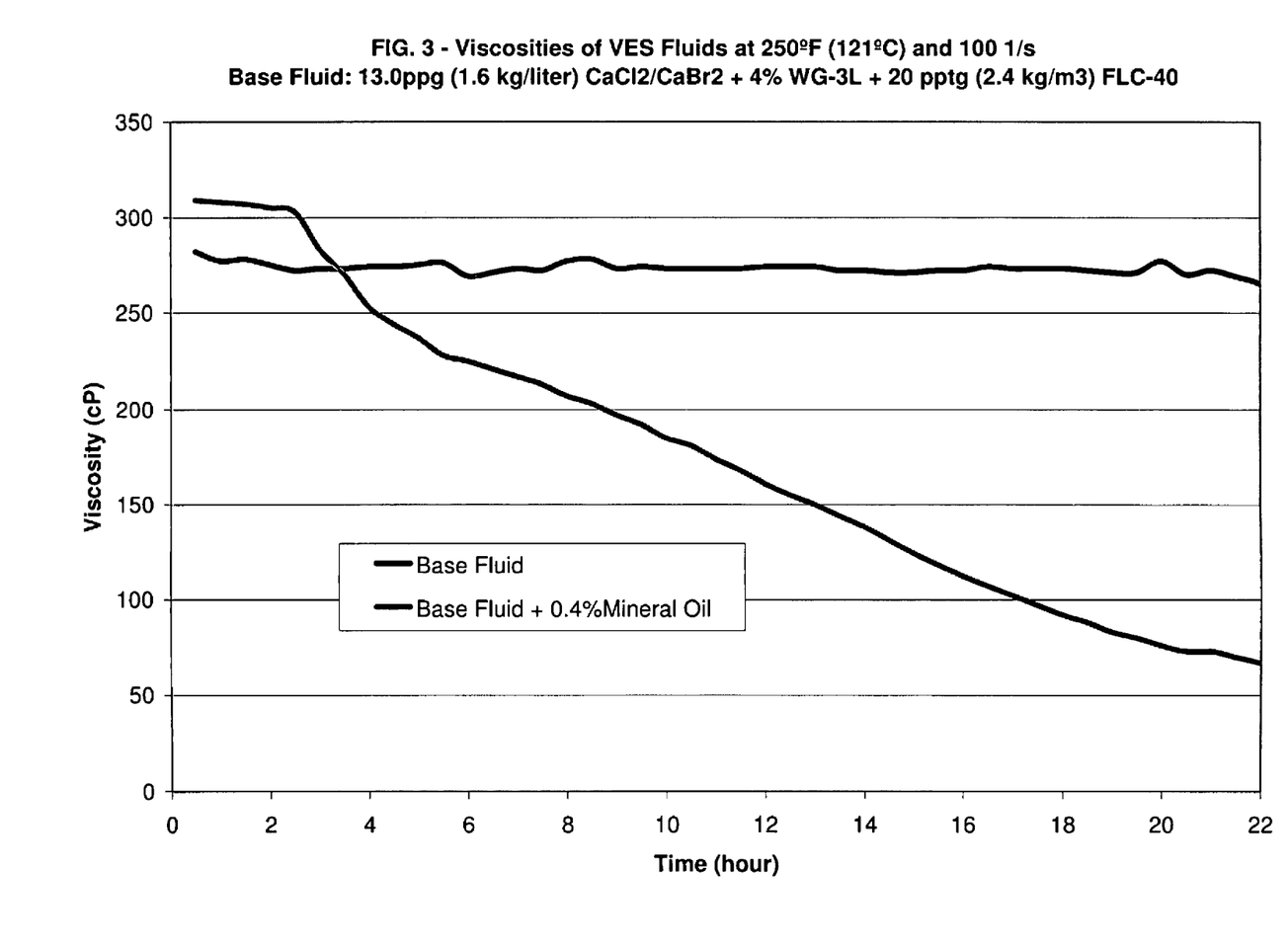
FIG. 3 is a graph of viscosity as a function of time for an aqueous fluid having 13.0 ppg (1.6 kg/liter) $CaCl_2/CaBr_2$ gelled with 4% WG-3L VES and containing 20 pptg (2.4 kg/M$^3$) FLC-40 fluid loss control agent at 250° F. (121° C.) and 100 1/s, without and with 0.4% mineral oil.

FIG. 3 is a graph of viscosity as a function of time for an aqueous fluid having 13.0 ppg (1.6 kg/liter) CaCl$_2$/CaBr$_2$ gelled with 4% WG-3L VES and containing 20 pptg (2.4 kg/m$^3$) of FLC-40 MgO (D$_{50}$=1 micron) fluid loss control agent available from Baker Oil Tools. The fluids were tested at 250° F. (121 ° C.) and 100 1/s, without and with 0.4% mineral oil. The viscosity of the fluid with no mineral oil held steady at about 275 cP for the time period, whereas the viscosity of the fluid with 0.4% mineral oil fluid loss additive began to decline noticeably after about 3 hours. This Example demonstrates that even at the low amount of 0.4%, mineral oil will act as a breaker of the fluid viscosity given enough time when select particulates are present, such as FLC-40.

Example 4

Figure 4:
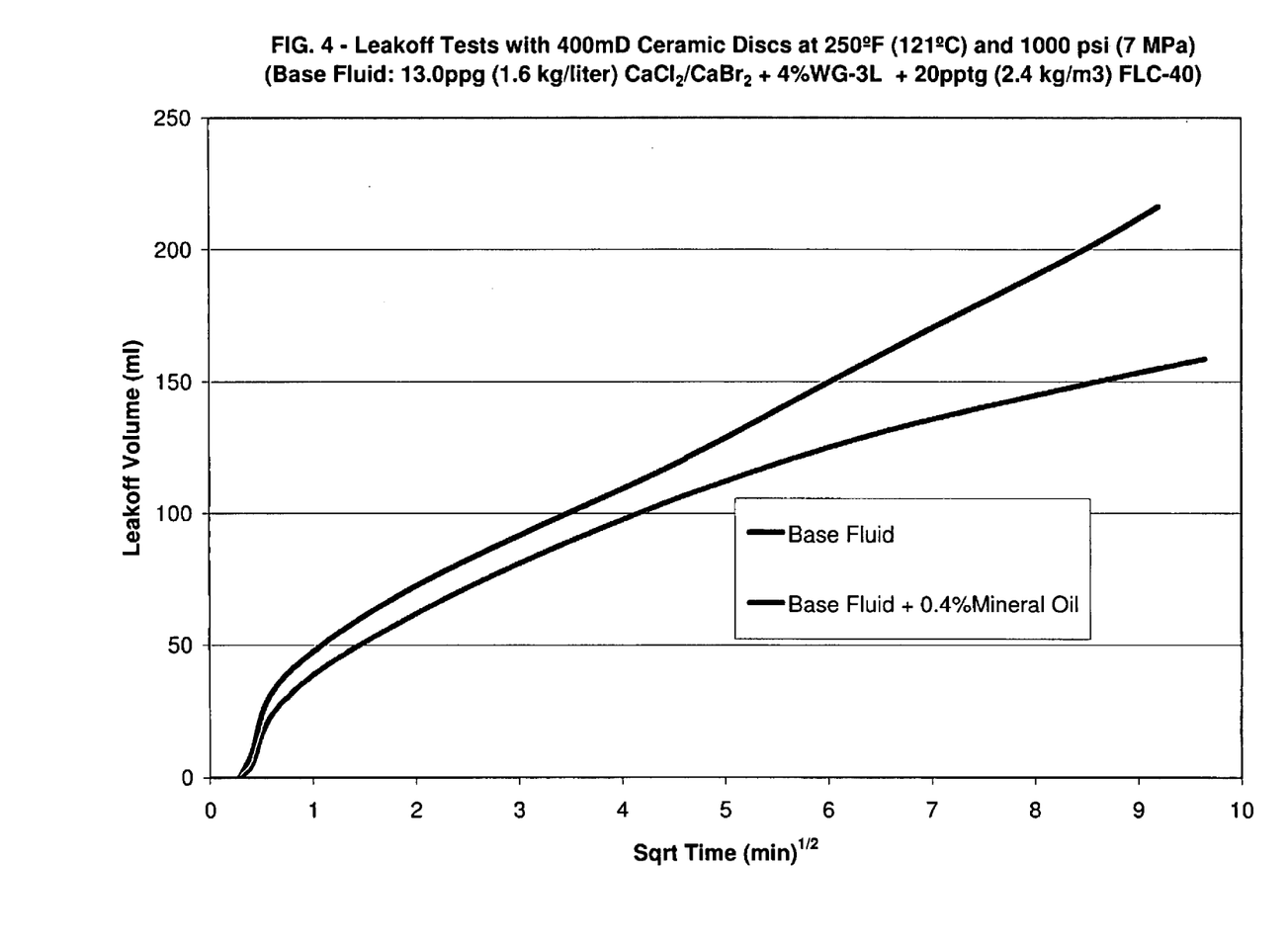
FIG. 4 is a graph of leakoff tests using 400 mD ceramic discs at 250° F. (121 ° C.) and 1000 psi (7 MPa) plotting leakoff volume as a function of the square root of time, where the base fluid is 13.0 ppg (1.6 kg/liter) $CaCl_2/CaBr_2$ gelled with 4% WG-3L VES and containing 20 pptg (2.4 kg/m$^3$) FLC-40 fluid loss control agent without and with 0.4% mineral oil.

FIG. 4 is a graph of leakoff tests using a base fluid of 13.0 ppg (1.6 kg/liter) CaCl$_2$/CaBr$_2$ gelled with 4% WG-3L VES with 400 mD ceramic discs at 250° F. (121 ° C.) and 1000 psi (7 MPa). Leakoff volume is plotted as a function of the square root of time. In fracturing treatment design, the slope of this curve (leakoff volume in mls vs. square root of time (min)$^{1/2}$) is used to calculate leakoff coefficient and spurt of the fracfluid. Both fluids contained 20 pptg (2.4 kg/m$^3$) of the FLC-40 fluid loss control agent. It may be seen that the fluid with only this agent leaked off more rapidly than did the fluid with also 0.4% mineral oil. This Example demonstrates that both leakoff improvement additives work together in an additive way to improve the leakoff characteristics of an aqueous fluid gelled with VES, and the rheology data show that they can work together in an additive way to controllably reduce VES fluid viscosity after fluid loss control period.

As can be seen, the method of improving fluid loss characteristics described herein is simple, effective, and safe.

In the foregoing specification, the invention has been described with reference to specific embodiments thereof, and has been demonstrated as effective in providing methods and compositions for improving the fluid loss properties of a VES fracturing fluid. However, it will be evident that various modifications and changes may be made thereto without departing from the broader spirit or scope of the invention as set forth in the appended claims. Accordingly, the specification is to be regarded in an illustrative rather than a restrictive sense. For example, specific combinations of viscoelastic surfactants, mineral oils, particulate additional fluid loss control agents and other components falling within the claimed parameters, but not specifically identified or tried in a particular composition or fluid, are anticipated to be within the scope of this invention.

The terms "comprises" and "comprising" in the claims should be interpreted to mean including, but not limited to, the recited elements.

What is claimed is:

1. A method for reducing fluid loss of an aqueous fluid gelled with a viscoelastic surfactant (VES) comprising adding to the aqueous fluid in any order:

at least one VES in an amount effective to increase viscosity of the aqueous fluid; and at least one particulate fluid loss control agent slurried in at least one mineral oil fluid loss control agent, where the at least one mineral oil fluid loss control agent has a dynamic viscosity greater than about 20 cps at ambient temperature, and where the at least one particulate fluid loss control agent is selected from the group consisting of alkaline earth metal oxides, alkaline earth metal hydroxides, transition metal oxides, transition metal hydroxides, and mixtures thereof, where the fluid loss control agents are present in amounts effective to reduce the fluid loss of the gelled aqueous fluid, the method further comprising synergistically reducing the viscosity of the gelled aqueous fluid as compared to using the mineral oil fluid loss control agent or the particulate fluid loss control agents independently.

2. The method of claim 1 further comprising pumping the aqueous fluid into a wellbore, where the aqueous fluid has reduced fluid loss into a subterranean reservoir as compared to an identical fluid absent the fluid loss control agents.

3. The method of claim 1 further comprising:
gelling the aqueous fluid with the VES;
pumping the aqueous fluid into a wellbore; and
controllably reducing viscosity of the gelled aqueous fluid by action of the fluid loss control agents.

4. The method of claim 1 where the at least one mineral oil fluid loss control agent is at least about 99 wt % paraffin.

5. The method of claim 1 where the at least one mineral oil fluid loss control agent has a distillation temperature above about 300° C.

6. The method of claim 1 where the effective amount of the at least one mineral oil fluid loss control agent ranges from about 0.2 to about 10% by volume (bv) based on the total fluid.

7. The method of claim 1 where the effective amount of the at least one particulate fluid loss control agent ranges from about 0.0001 to about 200 pptg (from about 0.01 g/m$^3$ to about 24 kg/m$^3$) based on the total fluid.

8. The method of claim 1 where the at least one particulate fluid loss control agent has a particle size equal to or less than about 0.2 millimeter.

9. A method for reducing fluid loss of an aqueous fluid gelled with a viscoelastic surfactant (VES) comprising:
adding a VES to an aqueous fluid in an amount effective to increase viscosity of the aqueous fluid; and
adding to the aqueous fluid before, during or after adding the VES, at least one particulate fluid loss control agent slurried in at least one mineral oil fluid loss control agent in an amount from about 0.2 to about 10% by based on the total fluid, where the mineral oil has a dynamic viscosity greater than 20 cps at ambient temperature, and where the particulate fluid loss control agent is selected from the group consisting of alkaline earth metal oxides, alkaline earth metal hydroxides, transition metal oxides, transition metal hydroxides, and mixtures thereof in an amount of from about 0.0001 to about 200 pptg (from about 0.01 g/m$^3$ to about 24 kg/m$^3$), where the at least one particulate fluid loss control agent has a particle size equal to or less than about 0.2 millimeter;
pumping the fluid into a wellbore, where the fluid has reduced fluid loss into a subterranean reservoir as compared to an identical fluid absent the at least one mineral oil fluid loss control agent and the at least one particulate fluid loss control agent; and
synergistically reducing the viscosity of the gelled aqueous fluid as compared to using the mineral oil fluid loss control agent or the particulate fluid loss control agent independently.

10. The method of claim 9 further comprising:
gelling the aqueous fluid with the VES; and
controllably reducing viscosity of the gelled aqueous fluid by action of the fluid loss control agents after the fluid is pumped into the wellbore.

11. The method of claim 9 where the at least one mineral oil fluid loss control agent is at least about 99 wt % paraffin.

12. The method of claim 9 where the at least one mineral oil fluid loss control agent has a distillation temperature above about 300° C.

* * * * *